INVENTORS.
Karl F. Braeuninger
Gordon K. Glaza
BY
Earl D. Ayers
AGENT

United States Patent Office 3,477,350
Patented Nov. 11, 1969

3,477,350
COMPOSITE STRUCTURAL SECTION
Karl F. Braeuninger, Ferguson, Mo., and Gordon K. Glaza, Midland, Mich., assignors to The Dow Chemical Company, Midland, Mich., a corporation of Delaware
Filed Apr. 5, 1968, Ser. No. 727,122
Int. Cl. E01c 5/00; E04c 1/30
U.S. Cl. 94—13                    4 Claims

ABSTRACT OF THE DISCLOSURE

This invention relates to composite structural member composed of at least two elongated structural sections which are placed together along abutting lengthwise edges and then locked together by bending adjacent upper and lower edge parts of the sections to engage the adjacent edges of the abutting sections. The locked together top and bottom edges have interlocking upper and lower tooth-like elements which engage each other and become fixed in position as the upper and lower edges are bent. The configuration of the locking joints utilize deformable locking and bearing rib elements and are arranged in a way which minimizes functional forces which would tend to unlock the joint.

---

Figure 1:
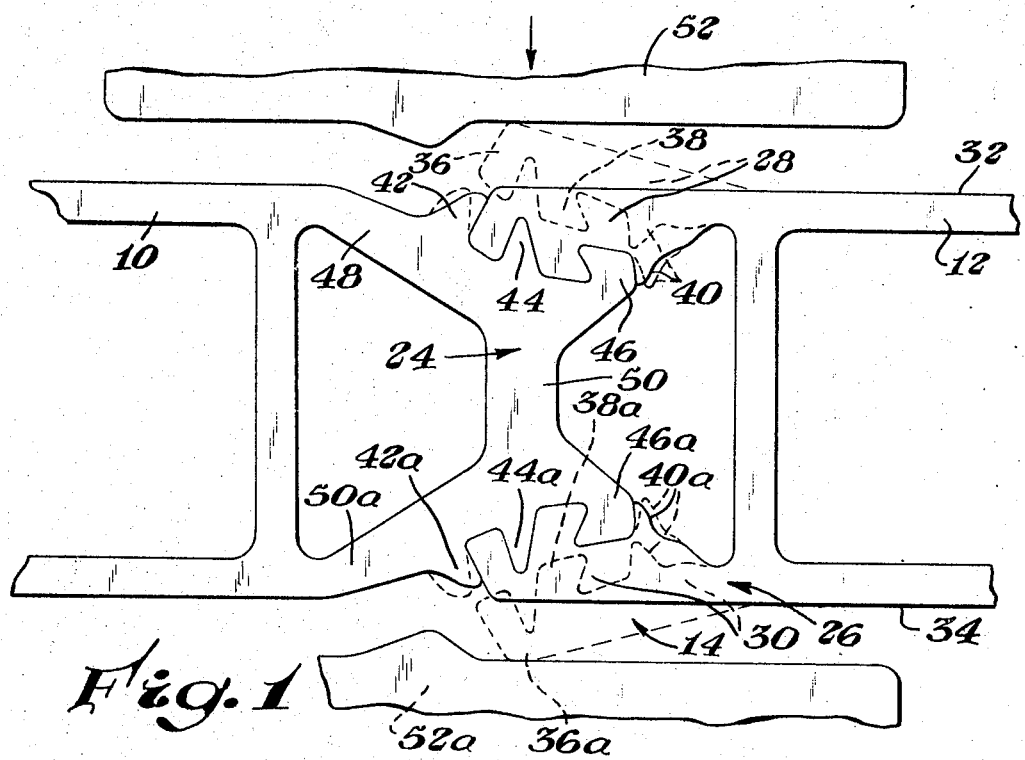

This invention relates to structural sections which are adapted to be interlocked with each other to provide a deck or surface which may be used as a temporary roadway, aircraft runway, or the like.

Such structural sections are usually made in the form of elongated planks which have interlocking sides and end parts. Usually the units have a more or less flat top and bottom parts which are spaced apart and joined by a plurality of web elements which extend longitudinally of the sections.

Because such units are desirable for use in making temporary military aircraft landing fields, for example, or for any purpose where the units must be transported a considerable distance to their point of usage, the units should be as light as possible consistent with the strength necessary to sustain the heavy loads encountered. Further, the weight per strucural unit should be light enough to permit manual handling during assembly of the runway or road.

In the past, if the top, bottom and webbing parts were made light enough to be acceptable from the standpoint of the gross weight of the structural unit, such units had a tendency to break near the end parts, e.g., at or near where the extruded mat section joins the coupling connector, where the units were joined together in an interlocking manner. However, recent developments have substantially eliminated this tendency. See, for example, applicant's U.S. Patent No. 3,319,543, filed May 5, 1965, for "Improved Structural Unit."

Another problem has arisen, however, because it is desired to have each structural unit made with a width of, for example, 24 inches. In a defense emergency, production of such 24 inch units is limited to the few plants having large diameter extrusion presses. To alleviate this problem, a need exists for structural units of lesser width which may be combined to form a composite structural unit having the standard width of 24 inches, for example.

An object of this invention is to provide a composite structural unit especially adapted for use in making temporary aircraft landing runways.

A further object of this invention is to provide an improved, strong, simple to assemble, composite structural unit.

In accordance with this invention there is provided a composite structural member composed of at least two elongated structural sections which are placed together along abutting lengthwise edges and then locked together by bending adjacent upper and lower edge parts of the sections to engage the adjacent edges of the abutting sections, and once the edge part of the sections are engaged, bending a locking rib at each end of the engaged part of the coupling joint.

The outer peripheral edges have end and side coupling means in any suitable form, such as those disclosed and claimed in applicant's U.S. Patent No. 3,319,543, filed May 5, 1965, for "Improved Structural Unit," for example.

The locked together top and bottom edges have interlocking upper and lower tooth-like elements which engage each other and become fixed in position as the upper and lower edges are bent. The configuration of the locking joint, particularly in connection with bent end locking ribs, are arranged in a way which minimizes functional forces which would tend to unlock the joint.

Figure 2:
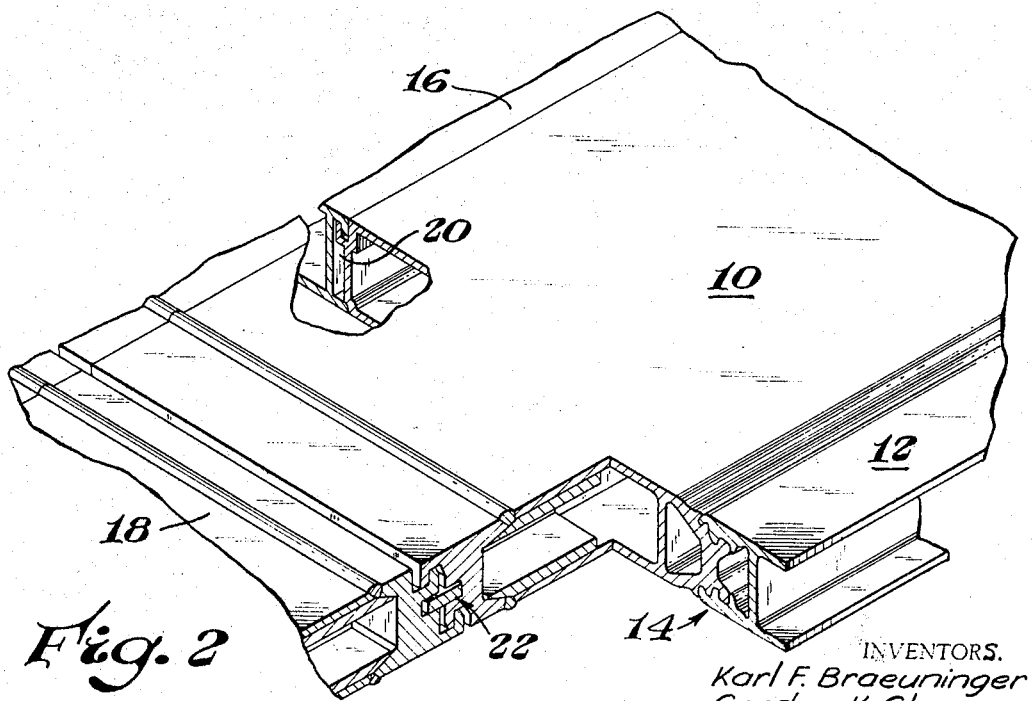

The invention, as well as additional objects and advantages thereof, will best be understood when the following detailed description is read in connection with the accompanying drawings, in which:

FIG. 1 is a fragmentary end elevational view of a composite structural unit in accordance with this invention, and FIG. 2 is a fragmentary isometric view showing the manner in which the end sections are joined together to form a composite structural unit.

Referring to the drawing, there is shown in FIG. 2 a pair of elongated webbed sections 10, 12, usually made of metal, which are locked together along a tapered, self-locking, formed multiple joint, indicated generally by the numeral 14, to form a composite, rigid structural unit.

An adjacent composite unit 16 is attached to the section 10 by the coupling 20, or by any other suitable coupling.

An end-adjacent unit 18 is attached to the end of the section 10 by means of a suitable coupling, such as the coupling joint 22. The couplings 20 and 22 are each described in applicant's U.S. Patent No. 3,319,543 referred to above.

The interior of the sections 10, 12 may be of any suitable form, such as that disclosed in the above mentioned application U.S. Patent No. 3,319,543, for example.

Referring now to FIG. 1 as well as FIG. 2, it may be seen that the multiple joint 14 is composed of a male section 24 attached to or integral with a lengthwise edge of the section 10 and a female section 26 attached to or integral with a lengthwise edge of section 12.

The female section 26 comprises an upper part 28 and a lower part 30 which, before the sections 10 and 12 are attached, are bent at an acute angle above or below, respectively, the planes of the flat surfaces 32, 34, respectively.

Each of the parts 28, 30 contain three similar protuberances 36, 38, 40 and 36a, 38a, 40a, respectively, corresponding protuberances on each part 28, 30 facing those on the other part 28, 30.

The upper and lower parts 28, 30, respectively, are plate-like in form and preferably extend along the entire upper and lower lengthwise edge, respectively, of the section 12 which faces the section 10. The protuberant ribs 36, 36a are each wider at their outer end than at the base thereof, and extend upwardly (or downwardly, as the case may be) at an outwardly extending acute angle as measured with respect to a plane which is perpendicular to the flat surface of the part 28 or 30 which extends parallel to the longitudinal axis of the section 12.

The protuberant ribs 38, 38a are each disposed at an inwardly extending acute angle as measured with respect to a plane which is perpendicular with respect to the flat surface of the part 28 or 30 and which extends parallel to the longitudinal axis of the section 12. Each of the protuberant ribs 38, 38a is wider at its outward end than it is at its inward end.

The space between the adjacent protuberant ribs 36, 38 and 36a, 38a has the configuration of a U-shaped channel whose side walls are adjacent sides of the ribs 36, 38 and 36a, 38a, respectively.

The protuberant ribs 40, 40a, as well as the ribs 38, 38a, extend in the same direction, as do the ribs 36, 36a.

The protuberant bearing ridges or ribs 40, 40a are less finger-like in transverse cross sectional configuration than are the locking ribs 36, 36a, and 38, 38a, having a wide base with the side adjacent to the section 12, the sides having a substantially uniform slope, usually more than 45 degrees, extending to the base of the ribs 40, 40a, respectively.

The male section 24 has a bore shaped as a trapezoidal tube in which the large base of the trapezoidal "tube" faces the section 10 and the slope of the side walls 48, 50a are equal to each other. The small base part 50 is disposed about midway between the sections 10, 12 when the sections are joined.

The exterior surface part of the male section 24 contains bearing ridges or ribs 42, 42a, 44 44a, and 46, 46a on its upper and lower surfaces, respectively, which are generally complementary in size, shape and position with respect to the ribs in the female section. That is, the ribs 44, 46 and 44a, 46a are shaped to fit slidably in the space between the ribs 36, 38 or 36a, 38a and 38, 40 or 38a, 40a, respectively. The space between the ribs 42, 44 or 42a, 44a is shaped to receive the ribs 36 or 36a, respectively.

Further, in assembly, the male and female sections 24, 26 are joined together by first bending the parts 28, 30 of the female section downwardly, as by the tool bars, 52, 52a to interleave the ribs of each part and then by bending the ribs 42, 42a towards the section 12 to lock the joined male and female sections together. As the parts 28, 30 are pressed downwardly, too, some cold flow of metal in rib 46 occurs which tends to move the top of the ribs 46, 46a towards the section 10, thus holding the ribs 38 or 38a securely in position.

Following the bending with the tools 52, 52a, a mandrel (not shown) is drawn through the space adjacent to the section 12 between the female parts 28, 30, to bend the ribs 40, 40a, towards the section 10, locking the ribs 40, 40a against the proximal surface of the ribs 46, 46a, respectively, of the male part.

The bending and locking of the ribs 40, 40a and 42, 42a, respectively, provides an improved, more rigid coupling with better distribution of loading forces than occurs when only one end of the joint is locked.

It can be seen that the coupling joint between the sections 10, 12 provides an essentially tapered connection similar to a tapered pipe thread. Such an arrangement results in a configuration of the femal part of the joint which doesn't require as wide an entry opening as would be required if the locking elements were arranged in a plane parallel to the top and bottom surfaces of the parts to be joined.

The strong central part 50 of the joint tends to prevent bending of the top and bottom of the joint while it is under load.

Thus, it may be seen, that utilizing the joining feature of this invention provides a composite structural unit which has the strength and is on substantially the same external configuration as such panels composed of a single integral structure.

What is claimed is:

1. A composite structural unit comprising:
   (a) a pair of elongated plate-like members each having, when joined together, a generally flat overall upper and lower surface, said plate-like members each having an edge part having joining means thereon;
   (b) said joining means comprising a female coupling section rigidly secured to said edge part of one plate-like member and a male coupling section rigidly secured to said edge part of the other of said pair of plate-like members;
   (c) said female coupling section having an upper and lower part extending lengthwise of said upper and lower surface of its plate-like member and outwardly from its plate-like member, said part having a pair of spaced apart, parallel locking ribs and a bearing rib extending towards the interior of said plate-like member, said bearing rib being closest to the plate-like member;
   (d) said male coupling section having a closed looped part including sides which extend angularly inwardly towards each other, each of said sides having three spaced apart parallel locking ribs extending therefrom in the direction of the closest of said surfaces, said locking ribs of both sides of said male section having a configuration adapted to receive the locking ribs of said female section in the space defined by the walls of the locking ribs of said male section and to mate with the space between the walls of the locking ribs and bearing ribs of said female section, the locking ribs of said male section which are nearest to and furthest from its plate-like member and the bearing rib of the female section which is closest to its plate-like member being deformable to bear against the side wall of the adjacent locking ribs of the female coupling section and against the locking rib of the male section which is furthest from its plate-like member, respectively, when said composite unit is operatively assembled to lock said locking ribs in said female coupling section whereby said upper and lower part thereof resists outward movement.

2. A structural unit in accordance with claim 1, wherein said unit is made of a light metal alloy.

3. A structural unit in accordance with claim 1, wherein said plate-like members have a web structure between said upper and lower surface.

4. A structural unit in accordance with claim 1, wherein said plate-like members have a length which is at least several times their width.

References Cited

UNITED STATES PATENTS

| 2,891,525 | 6/1959 | Moore | 29—515 |
| 3,055,461 | 9/1962 | DeRidder | 52—588 |
| 3,061,349 | 10/1962 | Dellith. | |
| 3,093,219 | 6/1963 | Ramme | 52—594 XR |
| 3,301,147 | 1/1967 | Clayton et al. | 94—13 |

FOREIGN PATENTS

| 913,328 | 12/1962 | Great Britain. |
| 416,332 | 11/1946 | Italy. |

JACOB L. NACKENOFF, Primary Examiner

U.S. Cl. X.R.

29—515; 52—586, 594